No. 661,503. Patented Nov. 13, 1900.
T. C. EBERHARDT.
FEEDER AND CLEANER FOR COTTON GINS.
(Application filed Dec. 23, 1899.)
(No Model.) 2 Sheets—Sheet 1.

Theophilus C. Eberhardt, Inventor

Witnesses
Edwin F. McKee
H. F. Bernhof

By
E. G. Siggers
Attorney

No. 661,503. Patented Nov. 13, 1900.
T. C. EBERHARDT.
FEEDER AND CLEANER FOR COTTON GINS.
(Application filed Dec. 23, 1899.)
(No Model.)
2 Sheets—Sheet 2.

Theophilus C. Eberhardt, Inventor

Witnesses
Edwin G. McKee

By
attorney

UNITED STATES PATENT OFFICE.

THEOPHILUS CHARLES EBERHARDT, OF PRATTVILLE, ALABAMA.

FEEDER AND CLEANER FOR COTTON-GINS.

SPECIFICATION forming part of Letters Patent No. 661,503, dated November 13, 1900.

Application filed December 23, 1899. Serial No. 741,400. (No model.)

*To all whom it may concern:*

Be it known that I, THEOPHILUS CHARLES EBERHARDT, a citizen of the United States, residing at Prattville, in the county of Autauga and State of Alabama, have invented a new and useful Feeder and Cleaner for Cotton-Gins, of which the following is a specification.

My invention is an improvement in feeders and cleaners for cotton-gins by which I seek to secure the elimination of refuse, such as sticks and hulls, from the seed-cotton and a disintegration of the seed-cotton itself in order to effect a thorough separation of sand from the cotton, all of which is obtained before the seed-cotton is fed to the gin. I also provide means by which the hard "locks" or lumps of cotton are prevented from passing with the loose or free locks to the separating and cleaning mechanism and all the refuse is discharged into a common receptacle, from which the refuse is positively forced by the action of a suitable conveyer.

With these ends in view my invention consists in the combination, with a picking feed-drum and a suitable means for conveying seed-cotton thereto, of a stripping and refuse-detaining mechanism, and a huller saw-cylinder in operative relation to the stripping and detaining mechanism and the picking-drum.

The invention further consists in the combination, with a picking feed-drum, of a huller saw-cylinder arranged to doff the seed-cotton from the picking-cylinder, a doffing brush-cylinder arranged to sweep frictionally against said saw-cylinder, and a screen in operative relation to the doffing brush-cylinder.

The invention further consists in the novel combinations of mechanism and in the construction and arrangement of parts for service, as will be hereinafter fully described and claimed.

In the accompanying drawings I have represented a feeder and cleaner for cotton-gins which embodies the several features of my invention in their preferred form, and to these drawings I shall now refer in order to explain more clearly the nature of the invention and the manner in which the same is or may be carried into effect.

Figure 1:
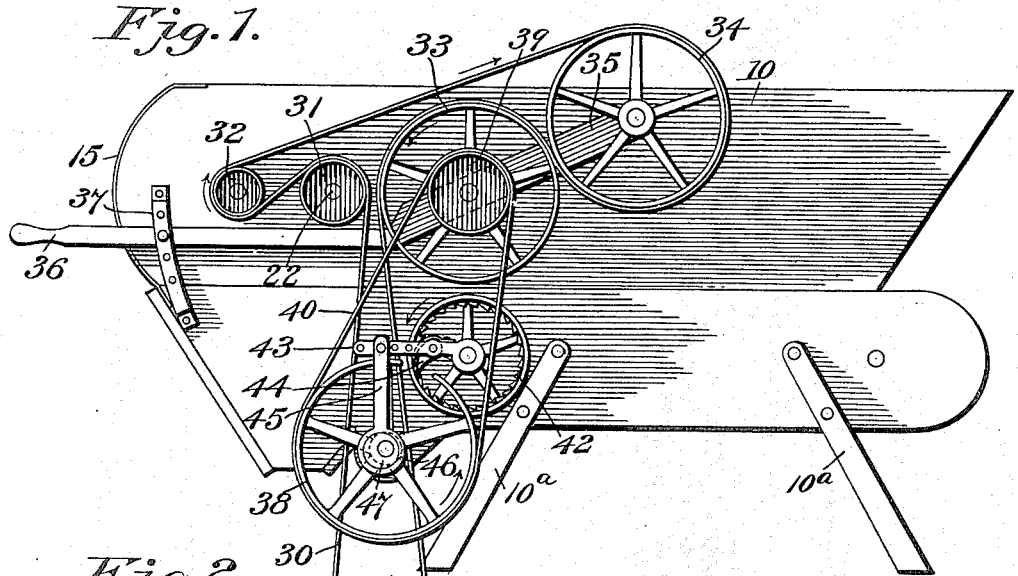
Figure 2:
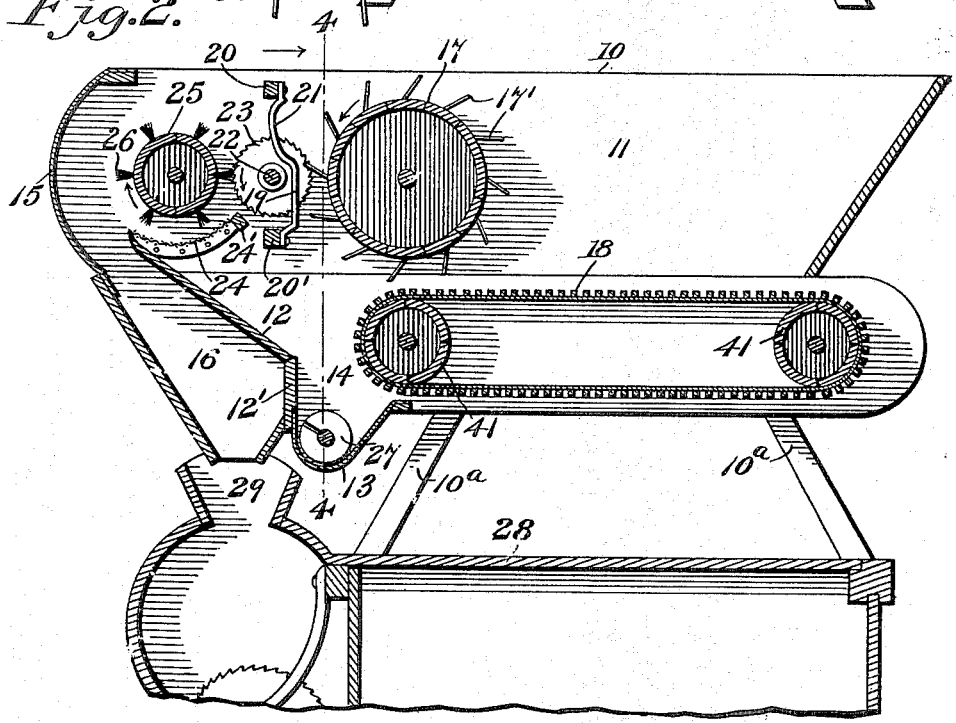
Figure 3:
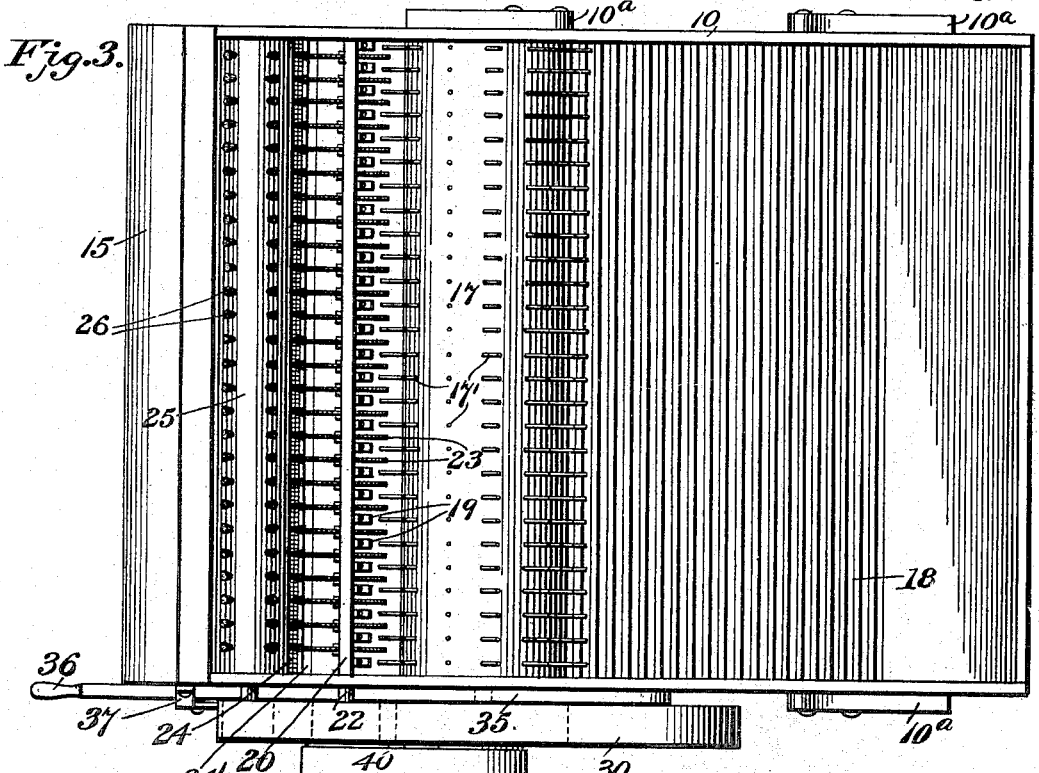
Figure 4:
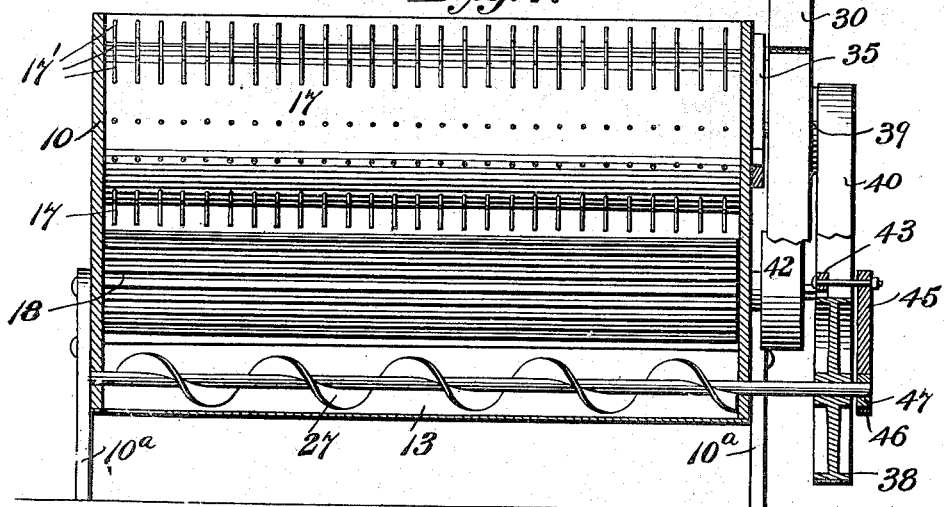

Figure 1 is a side elevation of a feeder and cleaner for cotton-gins constructed in accordance with my invention. Fig. 2 is a vertical longitudinal sectional elevation showing the improved feeder and cleaner in operative relation to an ordinary cotton-gin, a part only of the latter being indicated. Fig. 3 is a plan view of the cleaner and feeder shown by Fig. 1. Fig. 4 is a vertical transverse section taken in the plane of the dotted line 4 4 on Fig. 2 looking in the direction indicated by the arrow.

The same numerals of reference are used to indicate like and corresponding parts in each of the several figures of the drawings.

In carrying my invention into practice I employ a casing 10, which may be of any suitable form and dimensions to adapt the same for mounting upon an ordinary cotton-gin or gin-stand, said casing being preferably provided with the supporting-legs 10$^a$, as shown by Figs. 1 and 2. This casing of the feeder provides a cotton-receiving chamber 11 of large capacity, into which seed-cotton is deposited by any suitable or approved means. All the operating parts of the cleaner and feeder are contained within this casing 10, and the latter is divided so as to form a refuse-chamber and a seed-cotton passage by means of the partition 12, the latter being arranged near one end of the casing. This partition 12 has a section 12' thereof disposed in a vertical position, while the partition proper, 12, is inclined. A curved bottom 13, preferably of sheet metal, is secured to the vertical section 12' of the partition and to a part of the feeder-casing, so as to form in conjunction with the inclined partition 12 a refuse-chamber 14 near one end of the casing 10, into which chamber 14 are discharged the hard locks or lumps of cotton, the sticks and hulls, and the sand, which are eliminated from the seed-cotton before the latter is discharged into the receiving-mouth of the gin. The end of the casing contiguous to the brush-cylinder, to be presently described, is curved, as at 15, and between the partitions 12 12', the curved end wall 15, and an end portion of the casing 10 is formed a lint-discharge passage 16.

One of the operating parts of my improved cleaner and feeder is a revoluble picking-drum 17, which has its shaft journaled in suitable bearings provided in the casing 10, so that the picking-drum will lie within the cotton-receiving chamber 11, and this picking-drum is provided with a plurality of elongated teeth or spikes 17', which extend the full length of said drum and are arranged in positions preferably inclined to the radii of said drum. The seed-cotton may be conveyed or fed by any suitable means to the picking-drum—such, for example, as by an inclined chute or an ordinary pneumatic feeder or vacuum-box; but as one means for supplying the seed-cotton to the picking-drum I have shown an endless conveyer 18 by Figs. 2 and 3 of the drawings. This endless conveyer is supported by rollers or drums disposed in the same horizontal plane and below the plane of the picking-drum 17, the delivery end of said endless conveyer lying below and in the vertical plane of the picking-drum, so that the teeth or spikes of the latter may sweep close to the upper face of the conveyer. The picking-drum is designed to rotate in the direction of the arrow in Fig. 2 for the purpose of making the teeth pick and lift the loose locks or lumps of seed-cotton from the cotton-receiving chamber 11, so as to carry the same in an upward direction and over the picking-drum; but there is ample space provided between the upper surface of the apron and the teeth of the picking-drum for the hard locks or lumps of cotton, together with other refuse, to pass with the endless conveyer and be discharged therefrom into the refuse-chamber 14.

One of the important improvements which I have made in a seed-cotton feeder for use in connection with a cotton-gin is a stripping and refuse-detaining mechanism that is disposed in operative relation to the picking-cylinder 17 and serves to prevent sticks and cotton-hulls from passing to a doffing brush-cylinder, while at the same time the lint-cotton, with the cotton-seed, is free to pass this detaining mechanism. The stripping and refuse-detaining mechanism consists of a plurality of breast-ribs and a hulling saw-cylinder, which are disposed in opposing relation and substantially contiguous to the picking-cylinder. The plurality of breast-ribs 19 are arranged in vertical positions and close to the path described by the teeth of the picking-drum, and these ribs are supported firmly in place by the horizontal bars 20 20', the latter being arranged at the upper and lower ends of the ribs and fastened firmly to the sides of the feeder-casing 10 in any approved way. One of the peculiarities of this refuse-detaining and stripping breast resides in spacing the ribs 19 thereof for sufficient intervals in a manner to permit the cotton-seed, with the lint-cotton, to pass freely through the spaces between the ribs, as clearly indicated by Fig. 3 of the drawings; but the intervals between the ribs are not sufficient for the cotton-hulls and sticks to pass through said spaces, whereby the breast serves effectually to retain the sticks and hulls. This breast is supported directly over the refuse-chamber 14, and the sticks and hulls which lodge against the same are free to drop or fall by gravity from the breast and into the chamber, the picking-cylinder rotating in a direction for the refuse to drop into the chamber or for the picking-teeth to sweep the refuse into said chamber. The ribs of the breast may either be straight or they may be curved or offset at their upper portions, as at 21, and if the ribs are offset then this offset portion of each rib is above the horizontal plane of the huller-cylinder shaft and faces in a direction away from the picking-cylinder.

The shaft 22 of the huller-cylinder is journaled in suitable bearings of the feeder-casing 10, so as to lie close to the breast-ribs, below the offsets 21 therein, said shaft being disposed on the opposite side of the breast from the picking-drum. This shaft has a series of circular saws 23, held or secured firmly thereon by any suitable means, and these saws are spaced on said shaft so as to work in the intervals or spaces between the ribs of the detaining-breast. These saws are provided with fine saw-teeth, and they project well beyond the faces of the breast-ribs, so that the saws work in coöperative relation with the picking-drum for the purpose of doffing the cotton from the latter. The huller-cylinder also operates in coöperating relation to the detaining-breast, because the seed-cotton is subjected to a disintegrating or stripping action as it is carried through the spaces of the breast-ribs, and the huller-cylinder is thus adapted to transfer the lint-cotton, with the cotton-seed, from the picking-drum and the breast to the path of the brush-cylinder 25. The shaft of this brush-cylinder is journaled in suitable bearings of the feeder-casing, so that said shaft lies substantially parallel with and in the horizontal plane of the shaft of the huller saw-cylinder, and the inclined partition 12 of the feeder-casing is extended, so as to lie below this brush-cylinder, whereby the upper part of the partition is made to serve as a support for one edge of the segmental screen 24, the other edge of this screen being fastened to a suitable lag or bar 24'. (See Fig. 2.) This segmental screen lies directly below the brush-cylinder, and its receiving end is contiguous to the huller saw-cylinder, whereby the seed-cotton is adapted to be worked across the surface of this screen by the brushes 26 of the brush-cylinder. The lint-cotton, with the cotton-seed, is prevented by the screen from passing into the refuse-chamber 14; but this screen, in connection with the brush-cylinder, exerts a peculiar action on the seed-cotton for the purpose of thoroughly separating the sand and dirt from the cotton. It is to be observed that the huller saw-cylinder and the detaining-breast lie between the screen and the picking-drum and that the brush-cylinder has a plurality of flexible bristles arranged to sweep in working proximity to the surface of the screen. In the practical operation of this mechanism the bristles of the brush-cylinder in drawing the seed-cotton over the screen have a tendency to spread the particles of lint, and thus remove the sand and dirt more thoroughly than can be accomplished by any other means. I have found that the use of a spiked cylinder in connection with the segmental screen operates to carry the cotton forward in bulk or *en masse* without having any disintegrating effect thereon, thus permitting the sand to adhere to the lumps of cotton; but the employment of the stripping mechanism, substantially such as described, and the operative relation of the flexible bristles of the brush-cylinder 25 in working proximity to the curved screen 24 overcomes this defect and thoroughly eliminates the sand, the latter being free to drop through the screen and slide down the inclined partition 12 upon the bottom 13 of the chamber 14, in which operates a refuse-discharge conveyer. The flexible bristles of the brush-cylinder are arranged to sweep the teeth of the huller saw-cylinder for the purpose of doffing the lint-cotton and cotton-seed from the last-named cylinder, and this brush-cylinder rotates in an opposite direction to the huller-cylinder, so as to carry the lint-cotton and cotton-seed across the screen and discharge the same into the passage or flue 16. In the chamber 14, close to the curved bottom 13 thereof, is arranged an ordinary conveyer mechanism, which is shown in the form of a screw conveyer 27.

The entire feeder is placed above the ordinary gin 28, so as to be supported thereon by the legs, and the seed-cotton flue 16 of the feeder discharges directly into the mouth 29 of the gin, as shown by Fig. 2.

The saw-cylinder and the picking-drum rotate in one and the same direction, while the brush-cylinder rotates in an opposite direction. (See the arrows in Fig. 2.) I have provided suitable means for the operation of these parts and in connection therewith the discharge-conveyer 27 and one drum or roll of the endless conveyer 18. A pulley 31 is secured to the shaft of the huller saw-cylinder, another pulley 32 is secured to the shaft of the brush-cylinder, and a pulley 33 is secured to the shaft of the picker-drum; but of these three elements the pulley 32 of the brush-cylinder is the smallest of the series of pulleys, in order that the brush-cylinder may be driven at greater peripheral speed than the saw-cylinder or the picker-drum, the latter being driven at a comparatively slow speed. An idler-pulley 34 is supported by an angular lever 35 in close relation to the pulley 33 of the picker-drum, and this angular lever is loosely supported on the shaft of the picker-drum, as indicated by Fig. 1. The horizontal arm of this lever projects beyond one end of the feeder-casing, so as to be formed into a handle 36, and this lever may be locked in either of several positions by a suitable locking contrivance 37, the same being shown in the form of the perforated segment adapted to receive a pin or key. (See Fig. 1.) A continuous or endless driving-belt 30 extends around the series of pulleys 31 32 33, said belt being driven from any suitable source of power. As shown by Fig. 1, one lead of this drive-belt extends upwardly and over the pulley 31, thence beneath and around the pulley 32, thence over and beneath the idler-pulley 34, thence upwardly and over the pulley 33, and finally back to the source of power, whereby the pulleys 31 33 are driven in one direction for the like operation of the picking-drum and the saw-cylinder, while the pulley 32 and the brush-cylinder are driven in opposite direction.

The shaft of the screw conveyer 27 is provided with a pulley 38, and a smaller pulley 39 is secured on the shaft of the picker-drum, adjacent to the large pulley 33 thereon, said pulleys 38 39 being belted together by the short belt 40, thus driving the screw conveyer from the picking-drum shaft.

The endless conveyer 18 is supported by a pair of rollers or cylinders 41, one of which is provided with a suitable ratchet 42. This ratchet is propelled intermittently by a suitable feed mechanism, which is shown in Fig. 1 as embodied in a feed-lever 43, a pawl 44, a driving-lever 45, and eccentric connections 47 with the shaft of the screw conveyer. The lever 43 is mounted loosely on the roller-shaft which carries the ratchet, and the pawl 44 is hung on this lever in a manner for engagement with the ratchet-teeth. The driving-lever 45 is provided with a yoke 46, which closely embraces the eccentric 47 on the screw-conveyer shaft, and said lever 45 is adjustably connected with said driving-lever, whereby the eccentric is adapted to reciprocate the driving-lever, so as to oscillate the feed-lever and make the pawl intermittently turn the ratchet on the feed-roll shaft.

The operation is as follows: Seed-cotton in the condition in which it is gathered in the field is supplied by any suitable means to the chamber 11 of the feeder. This material substantially fills this chamber, so as to be supplied to the picking-drum by the endless conveyer; but the teeth of the drum carry only the loose or free lumps of cotton over the picking-drum, while the hard lumps of cotton are carried by the conveyer into the chamber 14. The cotton lodges against the stripping or detaining breast and is caught by the teeth of the saws on the revoluble huller-cylinder, so as to subject the cotton to a stripping action, and while the cotton and seed are carried by the saw-cylinder through the spaces between the ribs of the breast the sticks and hulls are caught by the breast and discharged into the chamber 14. The cotton and seed next pass to the brush-cylinder, the bristles of which sweep the lint-cotton and the seed away from the saws and over the concave screen, whereby the brushes exert a disintegrating action upon the lint-cotton to thoroughly eliminate the sand and dirt therefrom, the latter being discharged through the screen and into the chamber 14. The lint-cotton and the seed are now discharged into the passage 16 and thence to the gin to be treated therein in the ordinary manner, while the hard lumps of cotton, the sticks and hulls, and the sand which are supplied to the chamber 14 are carried by the screw conveyer through one side of the feeder.

Changes within the scope of the appended claims may be made in the form and proportion of some of the parts while their essential features are retained and the spirit of the invention embodied. Hence I do not desire to be limited to the precise form of all the parts as shown, reserving the right to vary therefrom.

Having thus described the invention, what I claim is—

1. In a cotton feeder and cleaner for gins, the combination of a casing having a refuse-chamber and a passage for seed-cotton, a picking-drum partially over said chamber, a stripping-breast arranged over the chamber and having openings or spaces of a width for said seed-cotton to pass therethrough, and a saw-cylinder rotating in the spaces of the breast and coöperating with the picking-drum.

2. In a cotton feeder and cleaner for gins, the combination of a casing having a refuse-chamber and a passage for seed-cotton, a picking-drum partially over said chamber, a screen situated over a part of the refuse-chamber, a brush-cylinder over the screen and arranged for its brushes to frictionally sweep the same and to discharge seed-cotton to the passage of the casing, and a saw-cylinder arranged between and in coöperative relation to the picking-drum and the brush-cylinder, substantially as described.

3. In a cotton feeder and cleaner for gins, the combination of a casing having a refuse-chamber and a passage for seed-cotton, a picking-drum partially over said chamber, a screen over a part of the refuse-chamber, a brush-cylinder frictionally sweeping the screen and discharging seed-cotton to the passage of the casing, a stripping-breast arranged over the refuse-chamber and between the picking-drum and the brush-cylinder, and a saw operating in the openings of the breast and in coöperative relation to the picking-drum and the brush-cylinder.

4. In a cotton feeder and cleaner for gins, the combination of a casing having a refuse-chamber and a passage for seed-cotton, a picking-drum partially over said chamber, a screen partially over the mouth of the refuse-chamber, a brush-cylinder, a stripping-breast over the refuse-chamber, between the picking-drum and the brush-cylinder, and comprising a series of vertical ribs spaced at intervals to form intermediate openings for the passage therethrough of seed-cotton, and a saw-cylinder working in the openings of the breast and coöperating with the picking-drum and the brush-cylinder.

5. In a cotton feeder and cleaner for gins, the combination of a casing having a refuse-chamber and a passage for seed-cotton, a picking-drum partially over said chamber, a screen partially over the refuse-chamber, a brush-cylinder, a stripping-breast between the brush-cylinder and the picking-drum, a saw-cylinder working in the spaces of the breast, and a conveyer within the refuse-chamber and operable to transfer refuse therefrom in a path at an angle to the line of feed of seed-cotton through the casing, substantially as described.

6. In a cleaner and feeder for cotton-gins, the combination with a feeder-casing divided by a partition into the refuse-chamber and the seed-cotton passage, a picking-drum, a conveyer mechanism arranged to discharge certain materials into the refuse-chamber, a screen at the upper part of the refuse-chamber and contiguous to the cotton-passage, a stripping and refuse-detaining mechanism close to the picking-drum and over the refuse-chamber, and a brush-cylinder arranged to sweep said screen, substantially as described.

7. In a cleaner and feeder for cotton-gins, the combination with a feeder-casing, a picking-drum, a brush-cylinder, a saw-cylinder between said cylinder and drum, a conveyer mechanism below the drum, pulleys secured to the shafts of the drum and cylinders, a lever carrying an idler-pulley, an endless drive-belt passing around said pulleys to rotate the picking-drum and the saw-cylinder in a common direction and to propel the brush-cylinder in an opposite direction, a screw conveyer driven from one of the shafts, and a pawl-and-ratchet feed mechanism from the screw conveyer to a roller-shaft of the endless conveyer, substantially as described.

8. In a hulling seed-cotton feeder for gins, the combination of the casing having a refuse-chamber and a passage for seed-cotton, a stripping-breast interposed in the path of the material over the refuse-chamber toward the said passage for seed-cotton, said breast having openings or spaces of a width for seed-cotton to pass therethrough, a picking-drum arranged at one side of the breast, and a saw-cylinder rotating in the spaces of the breast and coöperating with said drum, substantially as set forth.

9. In a cotton feeder and cleaner for gins, the combination of a casing having a refuse-chamber and a passage for the cleaned seed-cotton, a stripping-breast disposed over the chamber, a feeding-conveyer terminating contiguous to the chamber, a picking-drum between said conveyer and the stripping-breast and revoluble in a direction to transfer seed-cotton from the former to the latter, and a saw-cylinder adjacent to the breast, substantially as described.

10. In a hulling seed-cotton feeder for gins, the combination of the casing having a refuse-chamber, and a separate passage for seed-cotton, stripping mechanism for hulls and the like interposed in the path of the cotton over the refuse-chamber toward the passage for seed-cotton, a feeder for directing cotton toward the refuse-chamber, and a picking device coöperating with said feeder and the stripping mechanism, substantially as set forth.

In testimony that I claim the foregoing as my own I have hereto affixed my signature in the presence of two witnesses.

THEOPHILUS CHARLES EBERHARDT.

Witnesses:
JOHN M. COOK,
H. E. GIPSON.